No. 666,454. Patented Jan. 22, 1901.
H. P. BALL.
ELECTRICAL MEASURING INSTRUMENT.
(Application filed June 12, 1900.)
(No Model.) 2 Sheets—Sheet 1.

WITNESSES:
J. E. Pearson
James A. Cavanagh

INVENTOR
Henry P. Ball
BY
Geo. H. Benjamin
ATTORNEY

No. 666,454. Patented Jan. 22, 1901.
H. P. BALL.
ELECTRICAL MEASURING INSTRUMENT.
(Application filed June 12, 1900.)
(No Model.) 2 Sheets—Sheet 2.
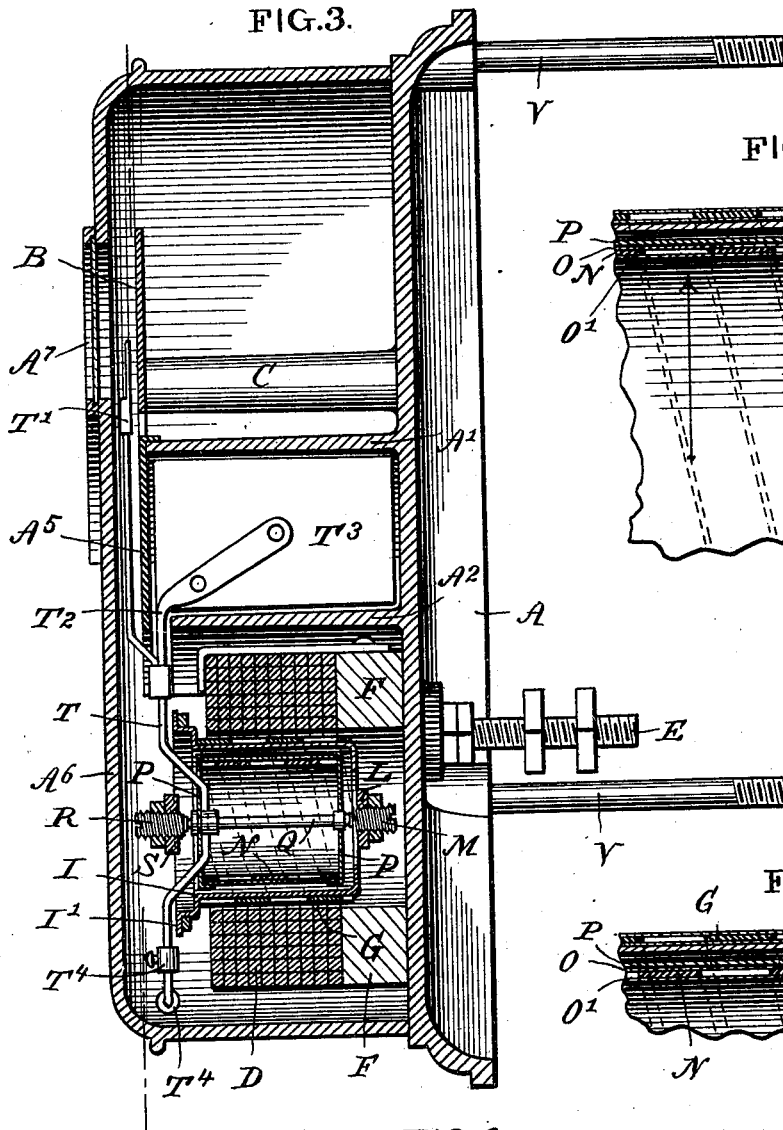
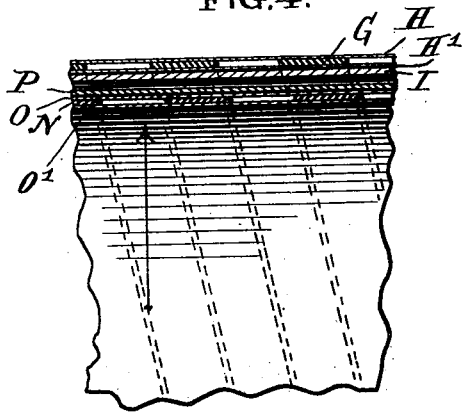
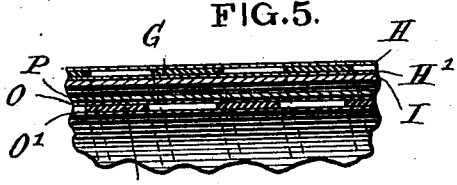
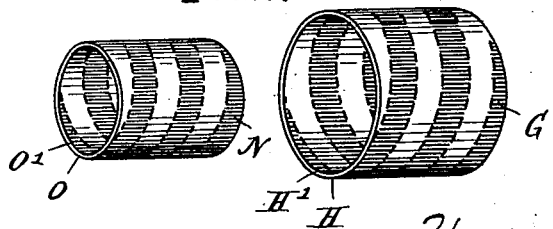
WITNESSES:
J. E. Pearson
James A. Cavanagh
INVENTOR
Henry P. Ball
BY
Geo. H. Benjamin
ATTORNEY
THE NORRIS PETERS CO., PHOTO-LITHO., WASHINGTON, D. C.

United States Patent Office.

HENRY PRICE BALL, OF NEW YORK, N. Y., ASSIGNOR TO THE GENERAL INCANDESCENT ARC LIGHT COMPANY, OF SAME PLACE.

ELECTRICAL MEASURING INSTRUMENT.

SPECIFICATION forming part of Letters Patent No. 666,454, dated January 22, 1901.

Application filed June 12, 1900. Serial No. 19,997. (No model.)

*To all whom it may concern:*

Be it known that I, HENRY PRICE BALL, a citizen of the United States, residing at New York city, county and State of New York, have invented certain new and useful Improvements in Electrical Measuring Instruments, of which the following is a specification.

My invention consists in a new and novel construction for electrical measuring instruments.

The object of my invention is an electrical measuring instrument which may be cheaply constructed and which will accurately measure electrical currents transmitted through it.

The accompanying drawings will serve to illustrate my invention, in which—

Figure 1:
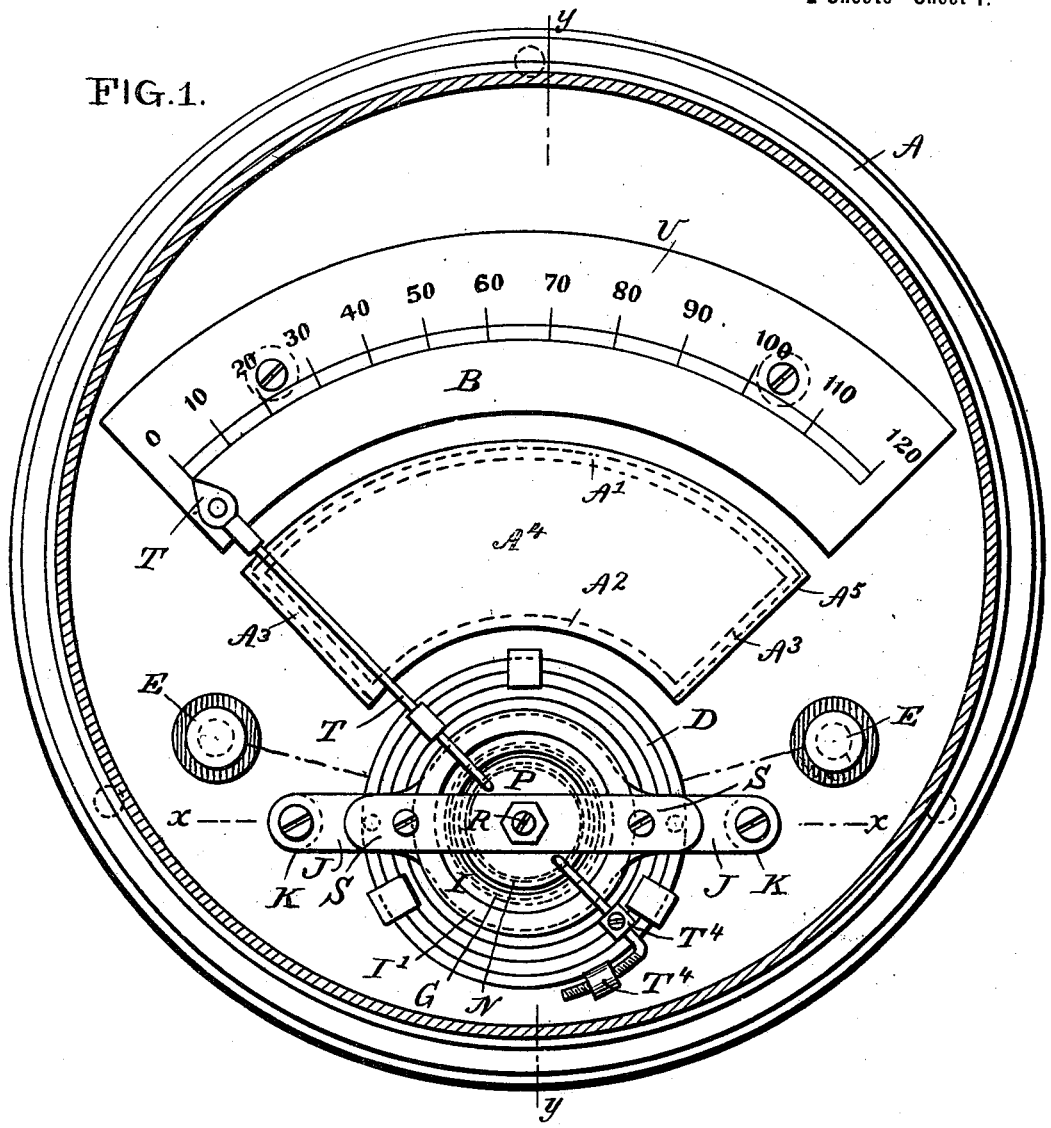
Figure 2:
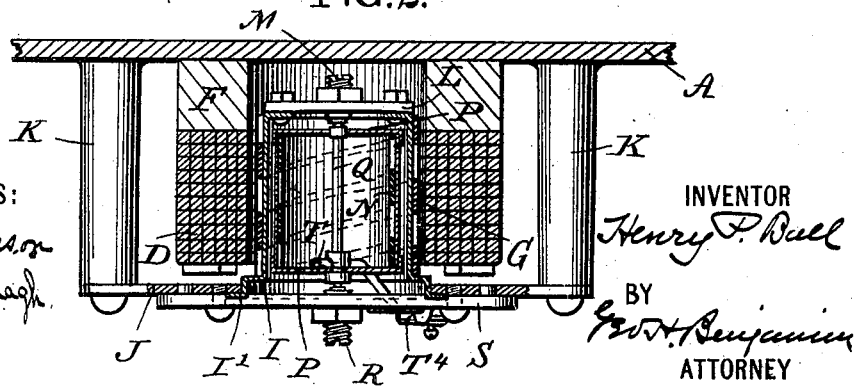

Figure 1 is a front elevation with the outer face or cover of the instrument removed. Fig. 2 is a transverse section on the line X X of Fig. 1. Fig. 3 is a vertical section on the line Y Y of Fig. 1. Figs. 4 and 5 are vertical sections through the spirally-arranged bodies of iron and their enveloping envelops, and are intended, respectively, to represent the position of the two spiral bodies of iron before movement of the inner movable spiral body of iron has begun and after its movement is ended. Fig. 6 is a pespective detached view of the outer and inner spirally-arranged bodies of iron and their enveloping envelops.

In the drawings, A represents the back or base plate of the instrument. Located on the outer face of this plate and cast integrally with it are the segmental projections $A'$ $A^2$ and the ends $A^3$. These projections collectively form a segmental box $A^4$, in which the air-damper for the pointer, to be hereinafter described, is located and moves. The box $A^4$ has a cover $A^5$ secured to the projection $A'$ and ends $A^3$ of the box, but not secured to the projection $A^2$, which is less in depth than the projection $A'$. By this arrangement a space is left between the projection $A^2$ and the cover $A^5$, in which the rod which carries the damper may be moved.

$A^6$ represents the front of the casing, properly secured to the back plate A. The upper portion of this casing has an arc-shaped slot $A^7$, through which the dial of the instrument and the end of the pointer may be seen.

B represents the dial, carried on the supports C. These supports may, if desired, be cast integrally with the back plate A.

D represents a fixed coil wound in the manner of a solenoid, the ends of which are respectively connected to the binding-posts E. The coil D is mounted on supports F, connected to the back plate A. Located within the cavity of the coil D is a spirally-wound body of iron G, Fig. 6. This body of iron is located within two cylinders of paper H H'. Situated within this body of iron is a cup I of brass or other non-magnetic material. This cup is provided with an outer flange I', which bears upon a plate J, secured on the columns K, which are secured to or cast integrally with the back plate A. The outer surface of the cup I forms a bearing for the spirally-wound body of iron G and around which this body of iron may be rotated when desired, as hereinafter explained. Normally, however, the cup serves to hold the spirally-wound body of iron in a fixed position by pressing it firmly against the inner surface of the fixed coil. At the back of the cup is fastened a plate L, carrying at its center an adjustable bearing M. Located within the cup I is a second spirally-wound body of iron N and situated between two cylinders of paper O O' in the same manner as the first body of iron. The second or inner body of iron N is held between the disks P, mounted on a shaft Q, which has its bearings at one end in the adjustable bearing M and at the other end in an adjustable bearing R, arranged in the middle of a plate S, which is secured to the plate J.

Connected to the shaft Q is a rod T, divided at its upper end to form the pointer T' and the support $T^2$ for the damper $T^3$. The lower end of the rod T carries the adjustable weight $T^4$.

U is the scale, divided in the usual manner.

V represents studs, through which the instrument may be connected to a wall or switchboard.

In the specification I have described the two bodies of iron as "spirally arranged." I have used this expression to differentiate between bodies of iron which form a continuous spiral and bodies of iron spirally arranged.

I have made this differentiation in order to have it understood that it is not essential that the iron of the spiral be continuous, as I find by experiment that the spirals may be divided transversely of their length—that is, have air-gaps—without affecting in any wise the operation of the instrument.

It will be observed that neither the inner nor the outer spirally-arranged bodies of iron form electrically-closed circuits, and consequently in the operation of the instrument no induced currents flow through these bodies of iron.

I wish it understood that by the term "bodies of iron" as used in this specification I include not only bodies of iron, but also other magnetically-responsive bodies.

In adjusting the instrument before the passage of the electrical current and in order to effect a revolution of the inner body of iron to the right the inner body is given a slight lead to the rear of the outer body, as indicated in Fig. 2. If it is desired that the revolution shall be to the left instead of to the right, the inner body should be given a slight lead to the front of the outer body.

The respective positions of the spirals (lead to the rear) when the instrument is actuated are indicated in the drawings as follows: in the first position in Figs. 2 and 4; in the second position—i. e., with the pointer midway of the scale—in Fig. 3, and in the last position—i. e., with the pointer at the end of the scale—in Fig. 5.

The arrow in Fig. 4 illustrates the direction of rotation of the inner spiral relative to the outer spiral with the lead to the rear, and, further, indicates the movement of a given point of the inner spiral horizontally forward from the first to the final position, whereby the body of the inner spiral is moved forward to fill the spaces between the convolutions of the outer spiral.

In initially adjusting the instrument it is requisite that the inner and outer spirally-wound magnetically - responsive bodies be given a definite position relative to each other and the scale. Should it be desired to change the relation, it may be accomplished by rotating the outer spirally-wound body of iron around its bearing on the cup I without altering the position of the inner spirally-wound body of iron. This change of relation between the two bodies of iron and the scale will correspondingly alter the reading on the scale.

The operation of the device is as follows: A current transmitted through the fixed coil sets up lines of force, in the path of which are the inner and outer spirally-wound bodies of iron. The result of this action is a turning movement to the right or left, depending upon the lead of the inner movable spirally-wound body of iron, which movement is resisted by the adjustable weight $T^4$ on the end of the rod T. The movement of the pointer T' will be proportional to the number of lines of force induced in the fixed coil.

The instrument is rendered practically dead-beat by means of the damper $T^3$ moving in the box $A^4$.

Having thus described my invention, I claim—

1. In an electrical measuring instrument, the combination of a source of magnetic lines of force, a stationary spirally-disposed member, a movable spirally-disposed member, and mechanism for indicating the degree of movement of the movable member.

2. In an electrical measuring instrument, the combination of a source of magnetic lines of force, a stationary spirally-disposed member, a movable spirally-disposed member, a pointer energized by the movable member, and a dial over which the pointer moves.

3. In an electrical measuring instrument, the combination of a source of magnetic lines of force, a stationary spirally-disposed member, a movable spirally-disposed member, a pointer, a dial over which the pointer moves, and means for damping the movement of the pointer.

4. In an electrical measuring instrument, the combination of a source of magnetic lines of force, a stationary spirally-disposed member, a movable spirally-disposed member, a counterweighted pointer, a dial over which the pointer moves, and means for retarding the movement of the pointer.

5. In an electrical measuring instrument, the combination of a source of magnetic lines of force, a stationary spirally-disposed member inclosed within a non-conducting envelop, a movable spirally-disposed member inclosed within a non-conducting envelop, and mechanism for indicating the degree of movement of the movable member.

6. In an electrical measuring instrument, the combination of a source of magnetic lines of force, a stationary spirally-disposed member, a movable spirally-disposed member, a pointer, a damper, a closed box within which said damper moves, and a dial over which the pointer moves.

7. In an electrical measuring instrument, the combination of the casing having a segmental box-like cavity formed on the outer face of the back plate thereof, a source of magnetic lines of force, a stationary spirally-disposed member, a movable spirally-disposed member, a pointer, and a damper energized by said movable member and moving in said segmental box.

8. In an electrical measuring instrument, the combination of a source of magnetic lines of force, an adjustable spirally-disposed member, a movable spirally-disposed member, and mechanism for indicating the degree of movement of the movable member.

9. In an electrical measuring instrument, the combination of a solenoid, a stationary spirally-arranged body of iron within said solenoid, a movable spirally-arranged body of iron within said stationary body of iron, and mechanism for indicating the degree of movement of the movable body of iron.

10. In an electrical measuring instrument, the combination of a rotatable spirally-arranged magnetically-responsive body, means for producing lines of force parallel to the axis of motion of said body, and means for increasing the length of the lines of force, said means bearing such relation to the rotatable body that the lines of force will be shortened by the rotation of the rotatable body.

In testimony whereof I affix my signature in the presence of two witnesses.

HENRY PRICE BALL.

Witnesses:
J. E. PEARSON,
W. H. PUMPHREY.